US012670027B2

(12) United States Patent
Maschmeyer et al.

(10) Patent No.: US 12,670,027 B2
(45) Date of Patent: Jun. 30, 2026

(54) METHODS AND SYSTEMS FOR INDICATING RESOURCE USAGE PARAMETER FOR PROMPTING A LARGE LANGUAGE MODEL (LLM)

(71) Applicant: Shopify Inc., Ottawa (CA)

(72) Inventors: Russ Maschmeyer, Berkeley, CA (US); Daniel Beauchamp, Toronto (CA)

(73) Assignee: SHOPIFY INC., Ottawa (CA)

( * ) Notice: Subject to any disclaimer, the term of this patent is extended or adjusted under 35 U.S.C. 154(b) by 411 days.

(21) Appl. No.: 18/446,930

(22) Filed: Aug. 9, 2023

(65) Prior Publication Data

US 2024/0311192 A1 Sep. 19, 2024

Related U.S. Application Data

(60) Provisional application No. 63/501,854, filed on May 12, 2023, provisional application No. 63/452,036, filed on Mar. 14, 2023.

(51) Int. Cl.
*G06F 9/50* (2006.01)
*G06N 5/022* (2023.01)

(52) U.S. Cl.
CPC .......... *G06F 9/5027* (2013.01); *G06N 5/022* (2013.01); *G06F 2209/5019* (2013.01)

(58) Field of Classification Search
None
See application file for complete search history.

(56) References Cited

U.S. PATENT DOCUMENTS

| | | | | |
|---|---|---|---|---|
| 2022/0180178 A1* | 6/2022 | Tasinga | ............... | G06F 11/3457 |
| 2024/0143414 A1* | 5/2024 | Ramanujan | .......... | G06F 9/5077 |
| 2024/0184812 A1* | 6/2024 | McDaniel | .............. | G06F 40/35 |
| 2024/0220326 A1* | 7/2024 | Martin | ................ | G06F 11/3495 |
| 2024/0256793 A1* | 8/2024 | Maschmeyer | .......... | G06F 40/40 |
| 2024/0378094 A1* | 11/2024 | Dwivedi | ............. | G06F 16/9024 |

OTHER PUBLICATIONS

Yuheng Kit (Sentiment Analysis Using Pre-Trained Language Model With No Fine-Tuning and Less Resource) IEEE Access: pp. 107056-107065; Oct. 13, 2022 (Year: 2022).*

* cited by examiner

*Primary Examiner* — Kaushikkumar M Patel
(74) *Attorney, Agent, or Firm* — Smart & Biggar LP

(57) ABSTRACT

Methods and systems for indicating a resource usage parameter for prompting a large language model (LLM) are described. A user input is received, from an electronic device, for generating a prompt to a LLM. A prompt resource usage parameter is computed based on the user input. A trained resource prediction model is used to generate a predicted response resource usage parameter for a response from the LLM, based on the user input. A total resource usage parameter is computed, based on the prompt resource usage parameter and the predicted response resource usage parameter. A representation of the total resource usage parameter is communicated to the electronic device, to cause the electronic device to provide an output of the representation of the total resource usage parameter.

20 Claims, 10 Drawing Sheets

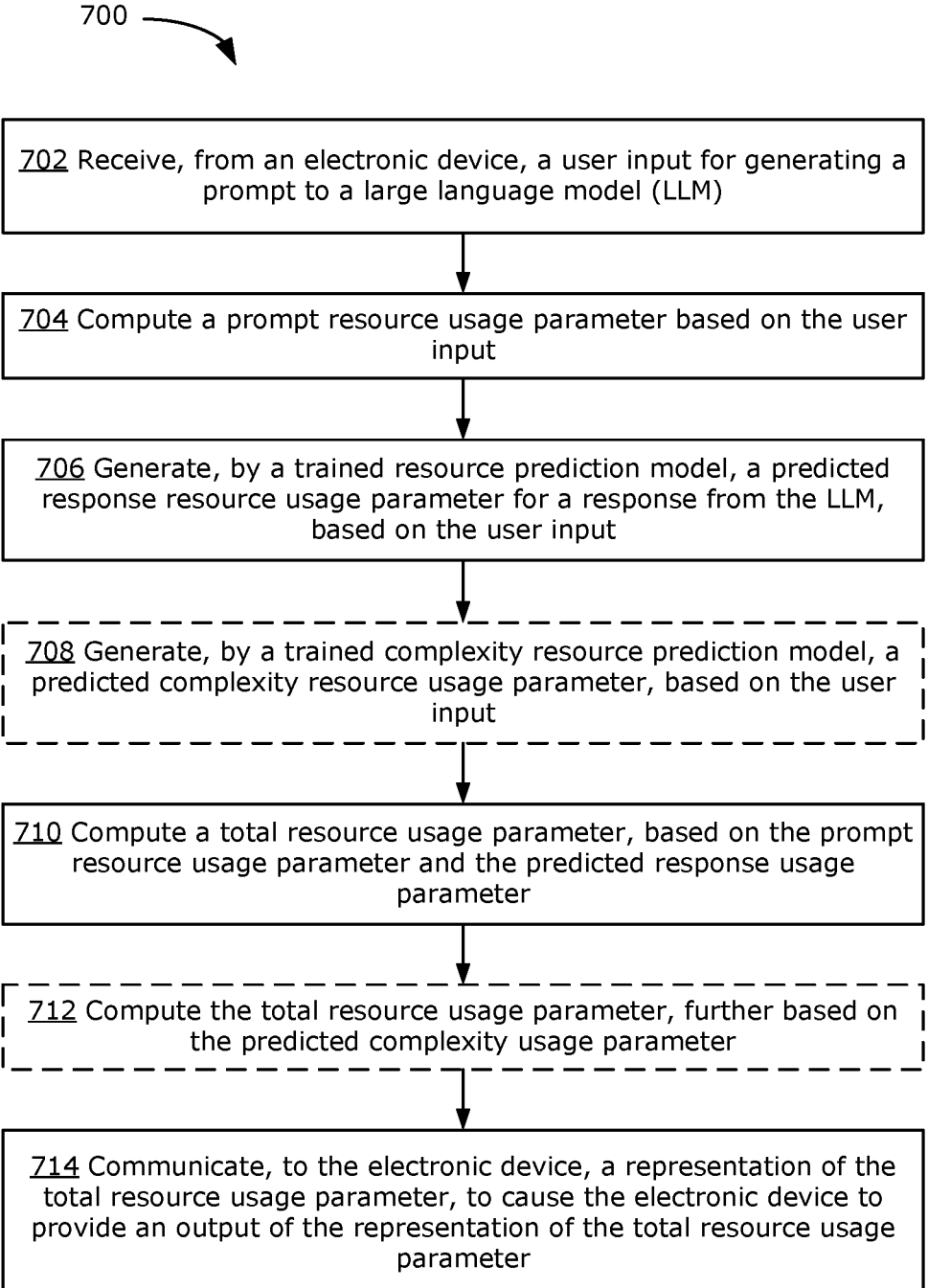

700

702 Receive, from an electronic device, a user input for generating a prompt to a large language model (LLM)

704 Compute a prompt resource usage parameter based on the user input

706 Generate, by a trained resource prediction model, a predicted response resource usage parameter for a response from the LLM, based on the user input 708 Generate, by a trained complexity resource prediction model, a predicted complexity resource usage parameter, based on the user input 710 Compute a total resource usage parameter, based on the prompt resource usage parameter and the predicted response usage parameter 712 Compute the total resource usage parameter, further based on the predicted complexity usage parameter 714 Communicate, to the electronic device, a representation of the total resource usage parameter, to cause the electronic device to provide an output of the representation of the total resource usage parameter

FIG. 4

METHODS AND SYSTEMS FOR INDICATING RESOURCE USAGE PARAMETER FOR PROMPTING A LARGE LANGUAGE MODEL (LLM)

CROSS-REFERENCE TO RELATED APPLICATIONS

The present disclosure claims priority from U.S. provisional patent application No. 63/501,854, filed May 12, 2023, entitled "METHODS AND SYSTEMS FOR INDICATING RESOURCE USAGE PARAMETER FOR PROMPTING A LARGE LANGUAGE MODEL (LLM)"; and U.S. provisional patent application No. 63/452,036, filed Mar. 14, 2023, entitled "METHODS AND SYSTEMS FOR INDICATING RESOURCE USAGE PARAMETER FOR PROMPTING A LARGE LANGUAGE MODEL (LLM)", the entireties of which are hereby all incorporated by reference.

FIELD

The present disclosure relates to machine learning, and, more particularly, to generation of prompts to large language models (LLMs), and, yet more particularly, to indicating a resource usage parameter associated with a prospective LLM prompt.

BACKGROUND

A large language model (LLM) is a type of machine learning (ML) model that is capable of generating text output, including natural language text output. A LLM may be provided with a prompt, which may be a natural language instruction that instructs the LLM to generate a desired output, including natural language text or other generative output in various desired formats.

SUMMARY

A method and system for predicting a resource parameter associated with prompting a large language model (LLM) and indicating a likelihood that a resource usage limit for the prompt will be reached, are provided. LLMs have finite resources for processing a prompt and/or generating output, which may limit the size of a prompt and/or the size of the generated output. Resource usage caps may therefore be imposed on prompts to a LLM, which can negatively impact the length and quality of the generated output. For example, exceeding a resource usage cap may inadvertently cause a prompt to be rejected or cause a generated output to be halted once the resource limit is reached. In some existing machine learning (ML)-based services for prompting a LLM, the user is typically unaware of resource usage caps and/or the percentage of total resources allocated to a prompt or to an output.

In various examples, the present disclosure describes a technical solution that enables the resource usage parameter associated with a current state of the prompt to be computed. An indication of the resource usage parameter may be displayed to a user in a prompt generator user interface (UI). Indication of a resource usage parameter may help to inform the user input to the prompt generator by communicating to the user a likelihood that a resource usage limit has been reached. This may provide the technical advantage that information is fed back (e.g., displayed via a UI) to avoid a prompt causing the resource usage limit to be reached and thus avoid causing the LLM to reject the prompt or to generate poor output.

In examples, the resource usage parameter may inform the user in generating the prompt based on characteristics of a desired output. The solution provides a benefit of automatically informing users whether a given resource usage parameter limit for the prompt will be reached, thereby minimizing the risk that the prompt will be rejected or that there will be insufficient resources for generating the desired output. In this regard, the user can adjust the user input in real-time to comply with the resource usage limit, mitigating any wasted time and/or computing resources associated with a rejected or halted generation. Thus, more efficient use of resources may be achieved.

User interactions may also be improved because the predicted resource usage parameter may be dynamically updated to reflect changes in the current state of the prompt, for example, as input is being received from a user. In this regard, indication of a resource usage parameter may help to avoid surprises at run-time, for example, with respect to LLM pricing models. By updating the counts dynamically as the user is typing, the user may be able to determine which of their inputs is most costly.

In various examples, the present disclosure describes a technical solution that may be provided by a platform (e.g., SaaS platform). The platform may serve as an interface layer between a user device and the LLM, to improve accessibility to the LLM.

In an example aspect, the present disclosure describes a system including a processing unit configured to execute computer-readable instructions to cause the system to: receive, from an electronic device, a user input for generating a prompt to a large language model (LLM); compute a prompt resource usage parameter based on the user input; generate, by a trained resource prediction model, a predicted response resource usage parameter for a response from the LLM, based on the user input; compute a total resource usage parameter, based on the prompt resource usage parameter and the predicted response resource usage parameter; and communicate, to the electronic device, a representation of the total resource usage parameter, to cause the electronic device to provide an output of the representation of the total resource usage parameter.

In an example of the example preceding system, wherein the electronic device is caused to display a prompt user interface (UI) enabling input of the user input and output of the representation of the total resource usage parameter.

In an example of the example preceding system, wherein the prompt UI includes one or more input fields for receiving a respective one or more portions of the user input, and the prompt resource usage parameter is determined based on each of the one or more portions of the user input received in each of the one or more input fields.

In an example of the example preceding system, wherein the representation of the total resource usage parameter is a representation of the total resource usage parameter with respect to a maximum resource capacity for the LLM.

In an example of the example preceding system, the processing unit may be configured to execute instructions to further cause the system to: compare the total resource usage parameter to a resource usage threshold based on the maximum resource capacity for the LLM; and in response to determining that the total resource usage parameter exceeds the resource usage threshold: communicate a warning to the electronic device, to cause the electronic device to provide an output of the warning.

In an example of the example preceding system, the processing unit may be configured to execute instructions to further cause the system to: further in response to determining that the total resource usage parameter exceeds the resource usage threshold: generate a recommendation for reducing the total resource usage parameter; and communicate the recommendation to the electronic device, to cause the electronic device to provide an output of the recommendation.

In an example of the example preceding system, the processing unit may be configured to execute instructions to further cause the system to: generate, by a trained complexity resource prediction model, a predicted complexity resource usage parameter for the prompt, based on the user input; wherein the total resource usage parameter is further computed based on the complexity resource usage parameter.

In another example aspect, the present disclosure describes a method including: receiving, from an electronic device, a user input for generating a prompt to a large language model (LLM); computing a prompt resource usage parameter based on the user input; generating, by a trained resource prediction model, a predicted response resource usage parameter for a response from the LLM, based on the user input; computing a total resource usage parameter, based on the prompt resource usage parameter and the predicted response resource usage parameter; and communicating, to the electronic device, a representation of the total resource usage parameter, to cause the electronic device to provide an output of the representation of the total resource usage parameter.

In an example of the example preceding method, wherein the electronic device is caused to display a prompt user interface (UI) enabling input of the user input and output of the representation of the total resource usage parameter.

In an example of the example preceding method, wherein the prompt UI includes one or more input fields for receiving a respective one or more portions of the user input, and the prompt resource usage parameter is determined based on each of the one or more portions of the user input received in each of the one or more input fields.

In an example of the example preceding method, wherein the representation of the total resource usage parameter is a representation of the total resource usage parameter with respect to a maximum resource capacity for the LLM.

In an example of the example preceding method, the method may further include: comparing the total resource usage parameter to a resource usage threshold based on the maximum resource capacity for the LLM; and in response to determining that the total resource usage parameter exceeds the resource usage threshold: communicating a warning to the electronic device, to cause the electronic device to provide an output of the warning.

In an example of the example preceding method, the method may further include: further in response to determining that the total resource usage parameter exceeds the resource usage threshold: generating a recommendation for reducing the total resource usage parameter; and communicating the recommendation to the electronic device, to cause the electronic device to provide an output of the recommendation.

In an example of the example preceding method, the method may further include: generating, by a trained complexity resource prediction model, a predicted complexity resource usage parameter for the prompt, based on the user input; wherein the total resource usage parameter is further computed based on the complexity resource usage parameter.

In another example aspect, the present disclosure describes a non-transitory computer-readable medium storing instructions executable by a processing unit of a computing system to cause the system to: receive, from an electronic device, a user input for generating a prompt to a large language model (LLM); compute a prompt resource usage parameter based on the user input; generate, by a trained resource prediction model, a predicted response resource usage parameter for a response from the LLM, based on the user input; compute a total resource usage parameter, based on the prompt resource usage parameter and the predicted response resource usage parameter; and communicate, to the electronic device, a representation of the total resource usage parameter, to cause the electronic device to provide an output of the representation of the total resource usage parameter.

In an example of the example preceding non-transitory computer-readable medium, wherein the electronic device is caused to display a prompt user interface (UI) enabling input of the user input and output of the representation of the total resource usage parameter.

In an example of the example preceding non-transitory computer-readable medium, wherein the prompt UI includes one or more input fields for receiving a respective one or more portions of the user input, and the prompt resource usage parameter is determined based on each of the one or more portions of the user input received in each of the one or more input fields.

In an example of the example preceding non-transitory computer-readable medium, wherein the representation of the total resource usage parameter is a representation of the total resource usage parameter with respect to a maximum resource capacity for the LLM.

In an example of the example preceding non-transitory computer-readable medium, the instructions may be executable to further cause the system to: compare the total resource usage parameter to a resource usage threshold based on the maximum resource capacity for the LLM; and in response to determining that the total resource usage parameter exceeds the resource usage threshold: communicate a warning to the electronic device, to cause the electronic device to provide an output of the warning.

In an example of the example preceding non-transitory computer-readable medium, the instructions may be executable to further cause the system to: generate, by a trained complexity resource prediction model, a predicted complexity resource usage parameter for the prompt, based on the user input; wherein the total resource usage parameter is further computed based on the complexity resource usage parameter.

BRIEF DESCRIPTION OF THE DRAWINGS

Reference will now be made, by way of example, to the accompanying drawings which show example embodiments of the present application, and in which:

FIG. 4 is a flowchart illustrating an example method for predicting a resource parameter associated with prompting a LLM, in accordance with examples of the present disclosure;

Similar reference numerals may have been used in different figures to denote similar components.

DETAILED DESCRIPTION

Figure 1A:
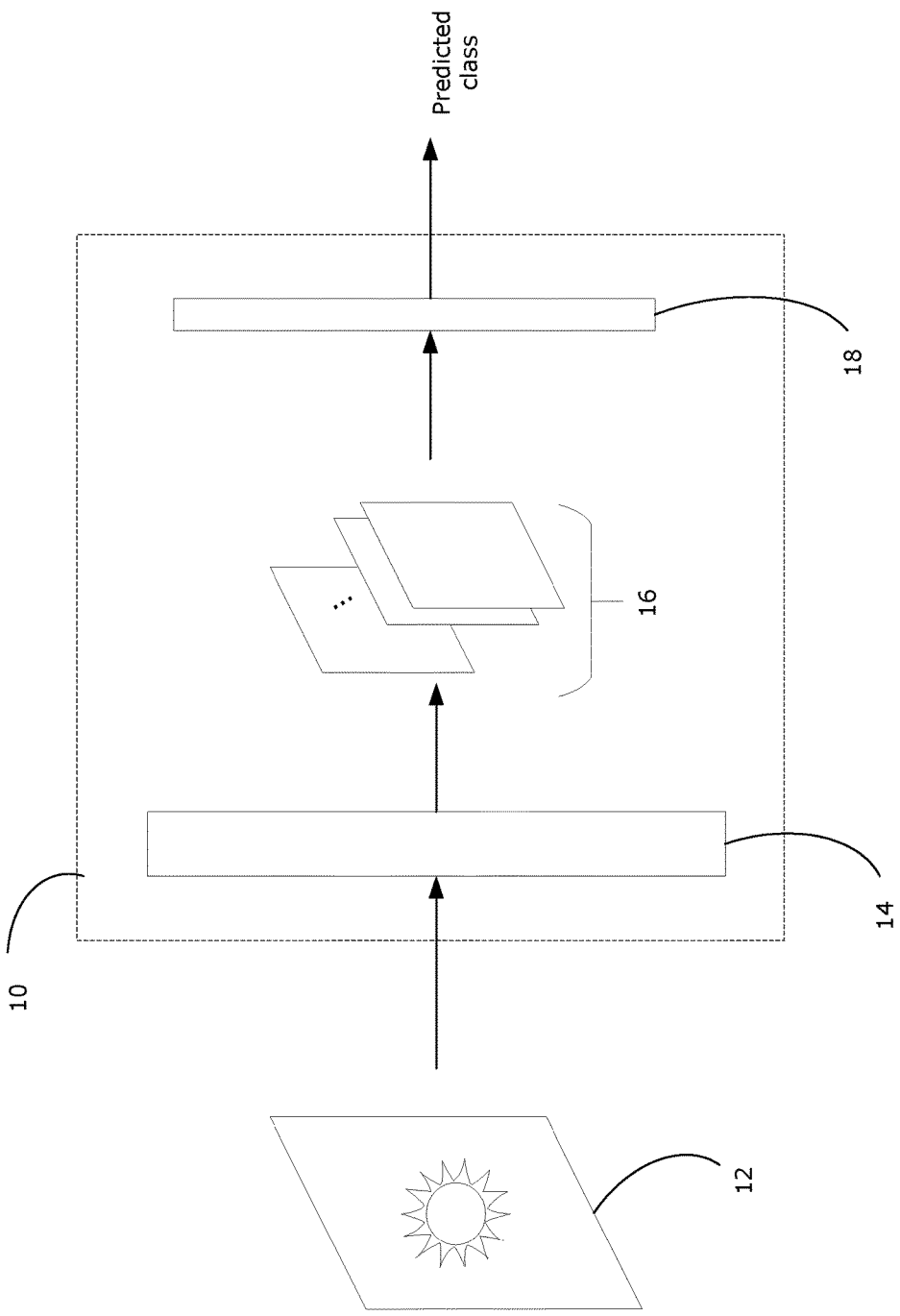
FIG. 1A is a block diagram of a simplified convolutional neural network, which may be used in examples of the present disclosure.

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publically-available text corpuses may be, e.g., fine-tuned by further training using the complete works of Shakespeare as training data samples (e.g., where the intended use of the ML model is generating a scene of a play or other textual content in the style of Shakespeare).

FIG. 1A is a simplified diagram of an example CNN 10, which is an example of a DNN that is commonly used for image processing tasks such as image classification, image analysis, object segmentation, etc. An input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 1B:
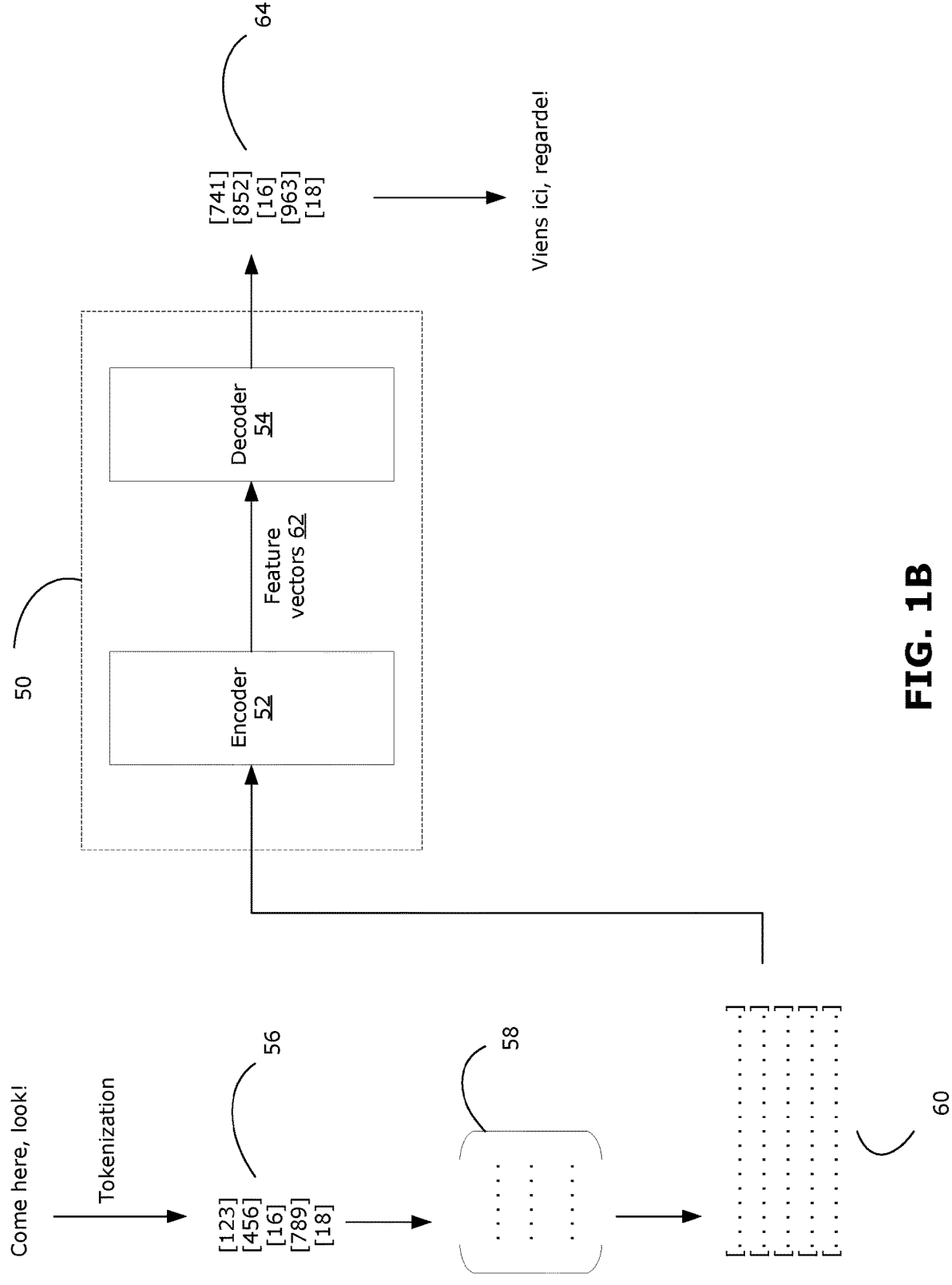
FIG. 1B is a block diagram of a simplified transformer neural network, which may be used in examples of the present disclosure.

FIG. 1B is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 1B, a short sequence of tokens 56 corresponding to the text sequence "Come here, look!" is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 1B for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 2:
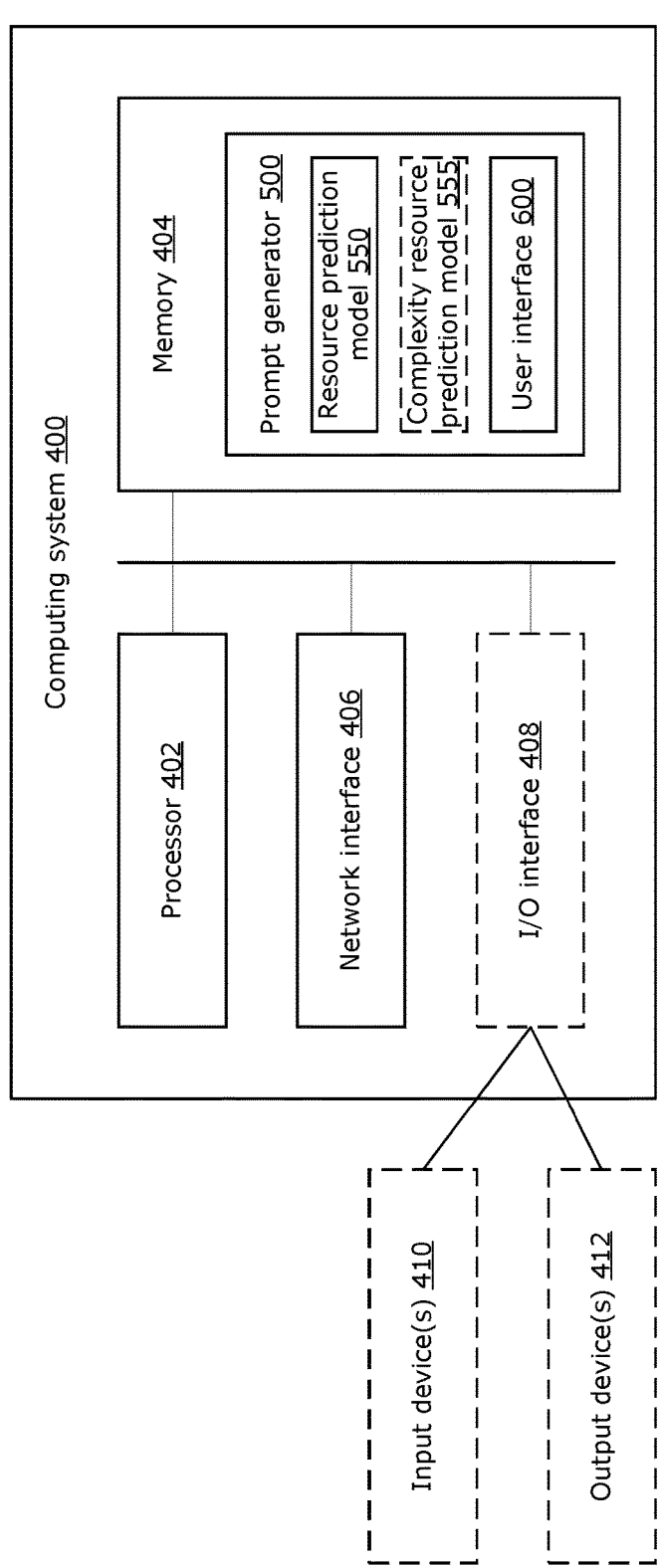
FIG. 2 is a block diagram of an example computing system, which may be used to implement examples of the present disclosure.

FIG. 2 illustrates an example computing system 400, which may be used to implement examples of the present disclosure, such as a prompt generation engine to generate prompts to be provided as input to a language model such as a LLM. Additionally or alternatively, one or more instances of the example computing system 400 may be employed to execute the LLM. For example, a plurality of instances of the example computing system 400 may cooperate to provide output using an LLM in manners as discussed above.

The example computing system 400 includes at least one processing unit, such as a processor 402, and at least one physical memory 404. The processor 402 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 404 may include a volatile or non-volatile memory (e.g., a flash memory, a random access memory (RAM), and/or a read-only memory (ROM)). The memory 404 may store instructions for execution by the processor 402, to the computing system 400 to carry out examples of the methods, functionalities, systems and modules disclosed herein.

The computing system 400 may also include at least one network interface 406 for wired and/or wireless communications with an external system and/or network (e.g., an intranet, the Internet, a P2P network, a WAN and/or a LAN). A network interface may enable the computing system 400 to carry out communications (e.g., wireless communications) with systems external to the computing system 400, such as a language model residing on a remote system.

The computing system 400 may optionally include at least one input/output (I/O) interface 408, which may interface with optional input device(s) 410 and/or optional output device(s) 412. Input device(s) 410 may include, for example, buttons, a microphone, a touchscreen, a keyboard, etc. Output device(s) 412 may include, for example, a display, a speaker, etc. In this example, optional input device(s) 410 and optional output device(s) 412 are shown external to the computing system 400. In other examples, one or more of the input device(s) 410 and/or output device(s) 412 may be an internal component of the computing system 400.

A computing system, such as the computing system 400 of FIG. 2, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

In the example of FIG. 2, the computing system 400 may store in the memory 404 computer-executable instructions, which may be executed by a processing unit such as the processor 402, to implement one or more embodiments disclosed herein. For example, the memory 404 may store instructions for implementing the prompt generator 500 application. In some examples, the computing system 400 may be a server of an online platform that provides the prompt generator 500 as a web-based or cloud-based service that may be accessible by a user device (e.g., via communications over a wireless network). Other variations may be possible without departing from the subject matter of the present disclosure.

In various examples, the present disclosure provides methods and systems for computing a total resource usage parameter associated with a prompt to a trained LLM, and providing a representation of the predicted total resource usage parameter. The predicted total resource usage parameter may be communicated to a user device in a manner that enables a user of the user device to adjust the user input in real-time to comply with the resource usage limit. The prompt generator 500 may provide a UI that enables a user to compose a block of text (e.g., containing natural language instructions). The UI may be locally accessible on a user device of the user (e.g., may be an application on a user device such as a desktop computer, smartphone, tablet, laptop, etc.) or may be an online service, provided by an online platform, that is accessible to the user device via a communication link (e.g., over a wireless network) with the platform.

The prompt generator 500, for example, may detect the entry of instructions for generating a prompt (e.g., communicated from a user device over a wireless network), for example, as text entered into one or more user input fields (e.g., text windows) of the UI. In examples, using a resource prediction model 550, the prompt generator 500 may compute a total resource usage parameter associated with the instructions and may provide a representation of the computed total resource usage parameter to the UI. In examples, the representation of the total resource usage parameter may be computed in real-time and may be dynamically updated as additional text or instructions are added to the user input field of the UI. It should be understood that although a UI is described in some examples of the present disclosure, this is not intended to be limiting. A representation of the total resource usage parameter may be communicated to the user device to cause the user device to provide any suitable output of the representation of the total resource usage parameter. For example, the representation of the total resource usage parameter may be outputted visually, verbally, audibly, or via any suitable output modality.

FIGS. 3A-3D illustrate an example UI 600 that may be provided by the prompt generator 500, in accordance with examples of the present disclosure.

Figure 3A:
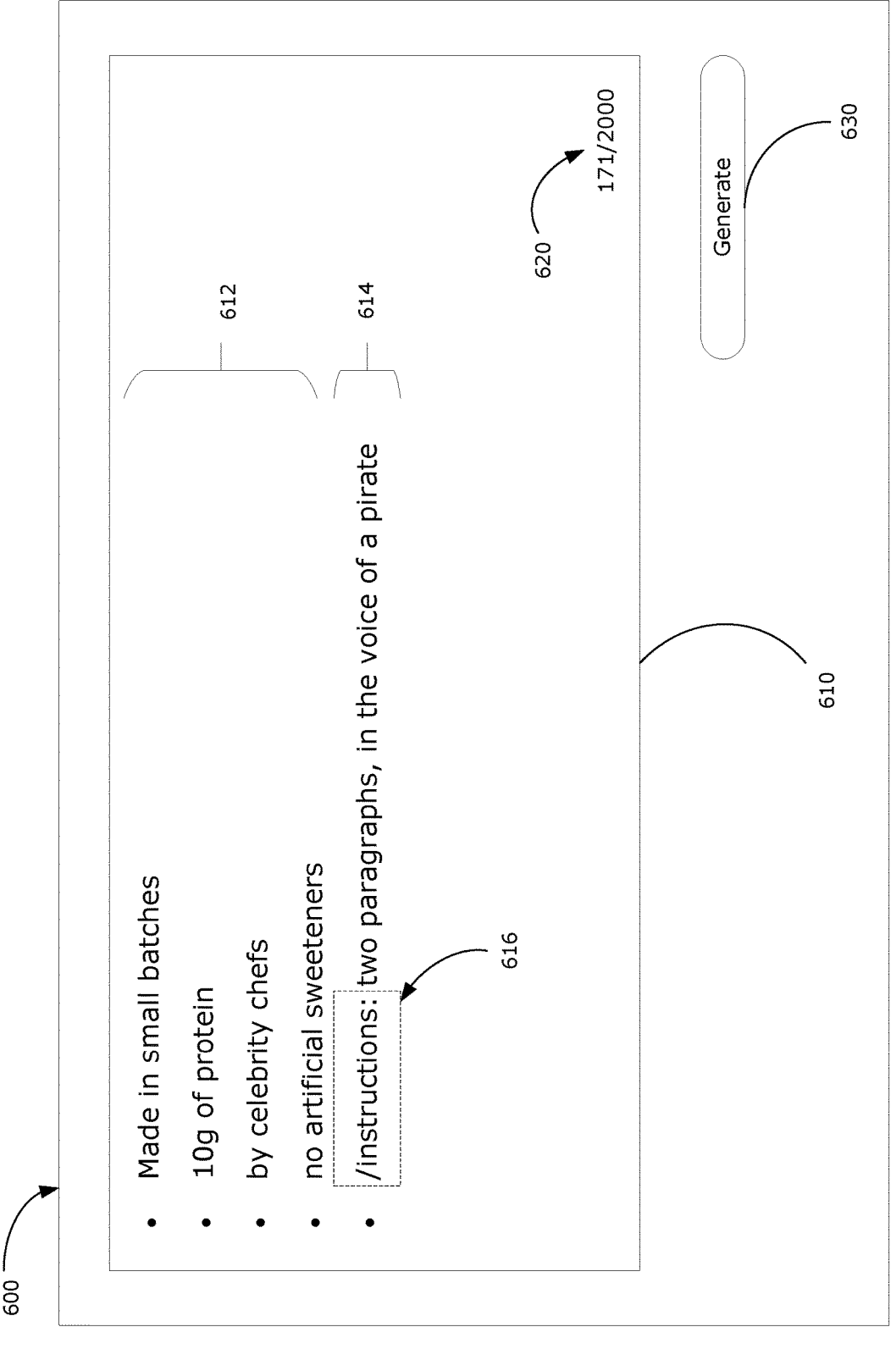
FIGS. 3A-3D illustrate examples of a prompt generator UI that may be provided in accordance with examples of the present disclosure.

As shown in FIG. 3A, the UI 600 may include a text input field 610 for inputting prompt instructions (e.g., manually typed, copied, imported, etc.) to the prompt generator 500. In examples, the text input field 610 may include a text entry including one or more user-inputted features 612 or special instructions 614 for generating the prompt. In examples, the UI 600 may include a selectable element for instructing the prompt generator 500 to generate the prompt, for example, a generate button 630, or another selectable element in the UI 600.

The prompt generator 500 converts the instruction(s) into one or more prompts to a LLM. For example, the generated prompt may be tokenized (by a tokenizer implemented by the prompt generator 500 or by another module of the computer system) and the set of tokens may be provided as input to the LLM (e.g., via an API call). In general, the generated prompt may be sent (e.g., via an API call) to the LLM as a set of tokens or untokenized (e.g., tokenization may be performed by the LLM or a remote system). Tokens are numeric representations of words or subwords. In examples, a tokenizer is a tool that can be used to convert a string of text into tokens. For example, a tokenizer may split a string of text into words or subwords and then assign each word or subword a token ID using a lookup table. In examples, a single word may be parsed into multiple tokens and different languages (e.g. English vs. Spanish) have different average proportions of tokens to characters. Technical limitations may require imposing a limit on the maximum number of tokens able to be sent to an LLM at a single time. For example, limitations in computer system memory and processing power may dictate the length of a sequence of tokens that can be processed. For example, longer sequences of tokens require more memory to store and process the sequence. In examples, a token limit may be based on a context length of the LLM or a maximum token setting set by a provider or imposed on users by the system. For example, an LLM may have a token limit of 4097 tokens which can be shared between a prompt and a response (e.g., a prompt that uses 4000 tokens will limit the response to a maximum of 97 tokens). In this regard, the combined number of tokens used by the prompt and the response cannot exceed the token limit.

In examples, a total resource usage parameter may represent an estimated token count associated with an anticipated AI generation, for example, including a computed prompt resource usage parameter (e.g., a number of tokens associated with the prompt $T_c$) and a predicted response usage parameter (e.g., a number of tokens associated with the generated response $T_r$). In other examples, the total resource usage parameter may represent a token count as a function of the token limit. In the present disclosure, an AI generation (or an anticipated AI generation) may include any AI transaction (e.g., any request to an AI system to obtain a response, such as a request to a LLM to obtain a generated response) and may not necessarily be limited to generative AI.

In examples, the total resource usage parameter may be used to determine a likelihood of exceeding a maximum resource capacity of the LLM, for example, a likelihood that a prompt will exceed the token limit or a likelihood that the LLM will reject the prompt based on exceeding a maximum token limit. As shown in FIG. 3A, a representation of the total resource usage parameter may be presented as a token counter 620, for example, a token count associated with the prompt with respect to a maximum number of tokens available for the AI generation (e.g., 171/2000). In another example, the token counter may count down from a maximum number of tokens available and display the number of available tokens remaining. Other examples of representations of total resource usage parameters are provided below with respect to FIG. 3B-3D. It should be understood that the example UI 600 presented herein is only exemplary and is not intended to be limiting.

In examples, the token count for a prompt may depend on a token count associated with a prompt overhead. In examples, prompt overhead can refer to aspects of the prompt that is fixed and does not vary based on any particular property or input. In some cases, the prompt overhead may be hidden from a user, for example, when using a prompt UI. In examples, the token count for a prompt may also depend on a token count associated with any user-inputted features or special instructions and any platform-inputted features or special instructions. For example, platform-inputted features or special instructions may be inserted by the platform based on user input. For example, a listing of user-inputted features 612 and special instructions 614 as shown in FIG. 3A may be received by the prompt generator 500 to generate the following example prompt (example 1) having a token count of 171 tokens (e.g., 748 characters):

Follow these instructions in priority order:
1. Use the below information to write a product description.
2. Include a paragraph that ties the given features to potential benefits.
3. Tailor the description to a potential buyer with the buyer attributes listed below.
4. Include only benefits you are confident asserting.
5. Don't make up features.
6. Keep the description concise, under 50 words if possible.
7. Avoid tropes, buzzwords, clichés, and repetition.
8. Follow the additional special instructions listed below.
Product name: Peanut butter protein bar.
Features: —Made in small batches
   10 g protein
   by celebrity chefs
   no artificial sweeteners
Special instructions: —Two paragraphs
   In the voice of a pirate Where the base instructions inserted by the platform are the instructions preceding the first \*\*\*\*, and where the features and/or special instructions may be inserted into the prompt by the platform based on a user input, for example, a user input into the prompt generator UI 600. In examples, the features and/or special instructions may each be inputted by a user and/or inputted (or otherwise provided) by the platform.

In example 1, the number of tokens associated with prompt overhead is 116 tokens. For example, the prompt overhead includes the following portions of the prompt of example 1:

Follow these instructions in priority order:
1. Use the below information to write a product description.
2. Include a paragraph that ties the given features to potential benefits.
3. Tailor the description to a potential buyer with the buyer attributes listed below.
4. Include only benefits you are confident asserting.
5. Don't make up features.
6. Keep the description concise, under 50 words if possible.
7. Avoid tropes, buzzwords, clichés, and repetition.
Product name:
Features:

In example 1, the number of tokens associated with user-inputted features or data is 27 tokens. User-inputted features or data can refer to specific user-inputted information relevant to the prompt, for example, for generating a product description for a product called "peanut butter protein bar" the prompt UI may receive a set of user-inputted features including the product name and a listing of product features to incorporate into the product description, among other user-inputted features:

Peanut butter protein bar
   Made in small batches
   10 g protein
   by celebrity chefs
   no artificial sweeteners In some cases, a prompt may include user-inputted special instructions, for example, the prompt generator 500 may process the input text to identify a special instruction by a specific formatting tag or command, for example, a particular character (e.g., "/") or combination of characters (e.g., /instructions: 616 as shown in FIG. 3A). In examples, the special instruction may not be included in any token count for the prompt. In example 1, the number of tokens associated with user-inputted special instructions is 11 tokens:

Two paragraphs
In the voice of a pirate

In examples, in response to recognizing a user-inputted special instruction the prompt generator 500 automatically inserts corresponding instructions into the generated prompt, for example, as platform-inputted instructions. In example 1, the number of tokens associated with platform-inputted special instructions is 17 tokens:

8. Follow the additional special instructions listed below.
Special instructions:

In another example, prompts may be modular to accommodate other "special sections" that may or may not be invoked by the user for a particular prompt, depending on the user inputs. For example, a UI 600 for generating a dating profile may provide the user with three text windows or sections to populate: Hobbies, Favorite Bands, and Ideal Date. If the user only populates for Hobbies and Favorite Bands, only the prompt overhead for those two sections need be included as in example 2 below:

Follow these instructions in priority order:
1. Use the below information to write a dating profile.
2. Tailor the profile with the user attributes and interests listed below.
3. Don't make up attributes or interests
4. Keep the profile concise, under 100 words if possible.
5. Avoid tropes, buzzwords, clichés, and repetition.
6. Make sure to incorporate the special sections described below.
First Name: Sam
Hobbies: —Hiking
   Playing guitar
   Cooking
Favorite Bands: —The Tragically Hip
   Neil Young
   Serena Ryder
Special sections: —Include Hobbies and Favorite Bands In examples, the total resource usage parameter may also include a predicted response resource usage parameter, for example, a predicted number of tokens associated with a generated response $T_r$ from the LLM. In examples, there may be general rules of thumb that govern token counts for blocks of text, for example in English, 1 token may generally represent 4 characters or 100 tokens may generally represent 75 words. In examples, for a given prompt, a trained resource prediction model 550 may estimate the number of tokens required to return a generated response for a given prompt. In examples, the trained resource prediction model 550 may be a machine learning model or another type of model.

In examples, the resource prediction model 550 may be trained using a training dataset of example prompts and their corresponding generated responses (e.g., as strings or as number of tokens), or in other examples, the response size resource prediction model may be trained using a training dataset of prompt embeddings. For example, the model may be trained to predict a token requirement based on an average of output token size across multiple similar prompts, where similarity may be based on prompt features such as recognizing the nature of the output, the length of the prompt, the number of features, the number of total instructions given, among others. In examples, the platform may engage or implement a prompt-similarity model to identify similar prompts, based on the above described or other prompt features. In examples, a prompt-similarity model may be a similarity ML model or a non-ML similarity matrix, or another non-ML solution.

In another example, the resource prediction model 550 may be trained to predict a token requirement based on the nature of the output, for example, if the prompt is directed toward generating a product description, the resource prediction model 550 may recognize that a typical product description contains, for example, 200 tokens. In another example, the resource prediction model 550 may be trained to predict a token requirement based on the merchant or based on a category of prompt, for example, merchant A typically generates product descriptions using 200 tokens however merchant B typically generates product descriptions using 300 tokens.

In examples, there may be other technical limitations that impact the ability of a LLM to execute a prompt, for example, limitations in computer system resources (e.g., memory and/or processing power, among others). Thus, in some examples the total resource usage parameter may not necessarily be directly related to a number of tokens. In other embodiments, for example, the total resource usage parameter may represent a token count associated with an anticipated AI generation combined with a complexity measure associated with processing the prompt. In examples, for a given prompt, a trained complexity resource prediction model 555 may estimate the complexity measure as a complexity resource usage parameter for the prompt (without necessarily estimating any token count as part of the resource prediction). In some examples, the complexity resource usage parameter may include, for example, an additional token count associated with a prompt or a generated response, or some other response-specific indicator of resource capacity of the LLM, for example, based on the specific kind of transaction the LLM accepts. For example, a complexity resource prediction model 555 may evaluate a prompt to identify additional token requirements of a prompt response that may impact the size of a returned response. For example, by preprocessing the input text (e.g., using NLP) to extract a user intent in the prompt, and predicting additional tokens $T_c$ which may be required to generate the response.

In an example, a prompt to an LLM may instruct the LLM to generate a script for a play including 10 characters and with a length constraint limiting the script to 5 pages. In examples, the complexity resource prediction model 555 may predict a resource size (e.g., token count) associated with a script including 10 characters that exceeds the 5 page constraint. In this regard, the complexity resource prediction model 555 may predict the number of additional tokens which may be required to accommodate the intent of the request, for example, by predicting how many tokens would be required to return a script including 10 characters.

In examples, the estimated complexity measure may be used to determine a likelihood of exceeding a maximum resource capacity of the LLM or a likelihood that the LLM will reject the prompt based on exceeding a maximum resource capacity. It should be understood that the maximum resource capacity of the LLM is not a global maximum (i.e. for the machine running the LLM) but rather is response-specific. In examples, the complexity resource prediction model 555 may be a machine learning model or another type of model. In some embodiments, for example, the complexity resource prediction model 555 may be trained using a training dataset of example prompts and respective generated responses (e.g., as strings or as a number of tokens), to predict the total resource usage parameter.

In examples, the total resource usage parameter for an anticipated AI generation, expressed as a total token count, may be described by the following equation:

$$\text{Total token count} = T_p + T_r + T_c$$

Where $T_p$ is the prompt resource usage parameter (e.g., a computed token count associated with the prompt), $T_r$ is the predicted response resource usage parameter (e.g., a predicted token count associated with the generated response), and $T_c$ is complexity measure (e.g., the predicted token count associated with added response complexity), and where $T_c$ can be determined by subtracting $T_p$ and $T_r$ from a predicted total token count associated with the maximum resource capacity.

In examples, the resource prediction model 550, for example, along with the optional complexity resource prediction model 555, may dynamically compute the total resource usage parameter in response to user text input into the UI 600. The total resource usage parameter may be received in response to an API call and as shown in FIG. 3A, the resource usage parameter may be outputted to be displayed on a user device via the UI 600 as a token counter 620. For example, the resource usage parameter may be received by a computing system (e.g., a server of an online platform) and may be communicated to the user device via a communication link (e.g., over a wireless network).

Figure 3B:
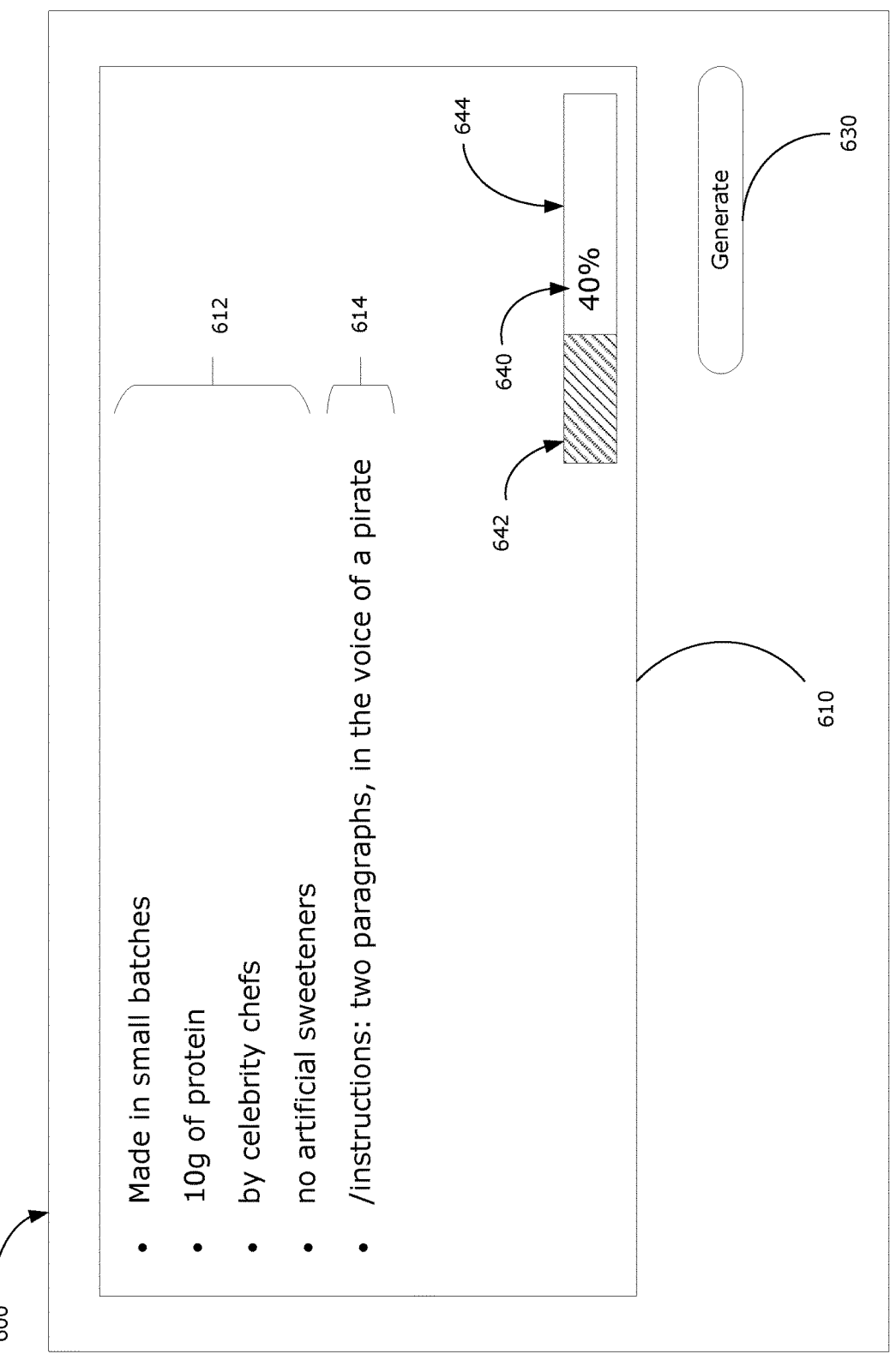

FIG. 3B illustrates an example UI 600 that may be provided by the prompt generator 500, in accordance with examples of the present disclosure. The UI 600 may include a text input field 610 for inputting user-inputted features 612 or special instructions 614 to the prompt generator 500. A representation of the total resource usage parameter may be presented as a progress bar 640, for example, depicting a current state of the total resource usage parameter as a percentage of the maximum resource capacity of a given LLM (e.g., 40%). In examples, the progress bar 640 may visually depict the proportion of the resource capacity that is allocated to the prompt 642 and the proportion of resource capacity that is available 644.

Figure 3C:
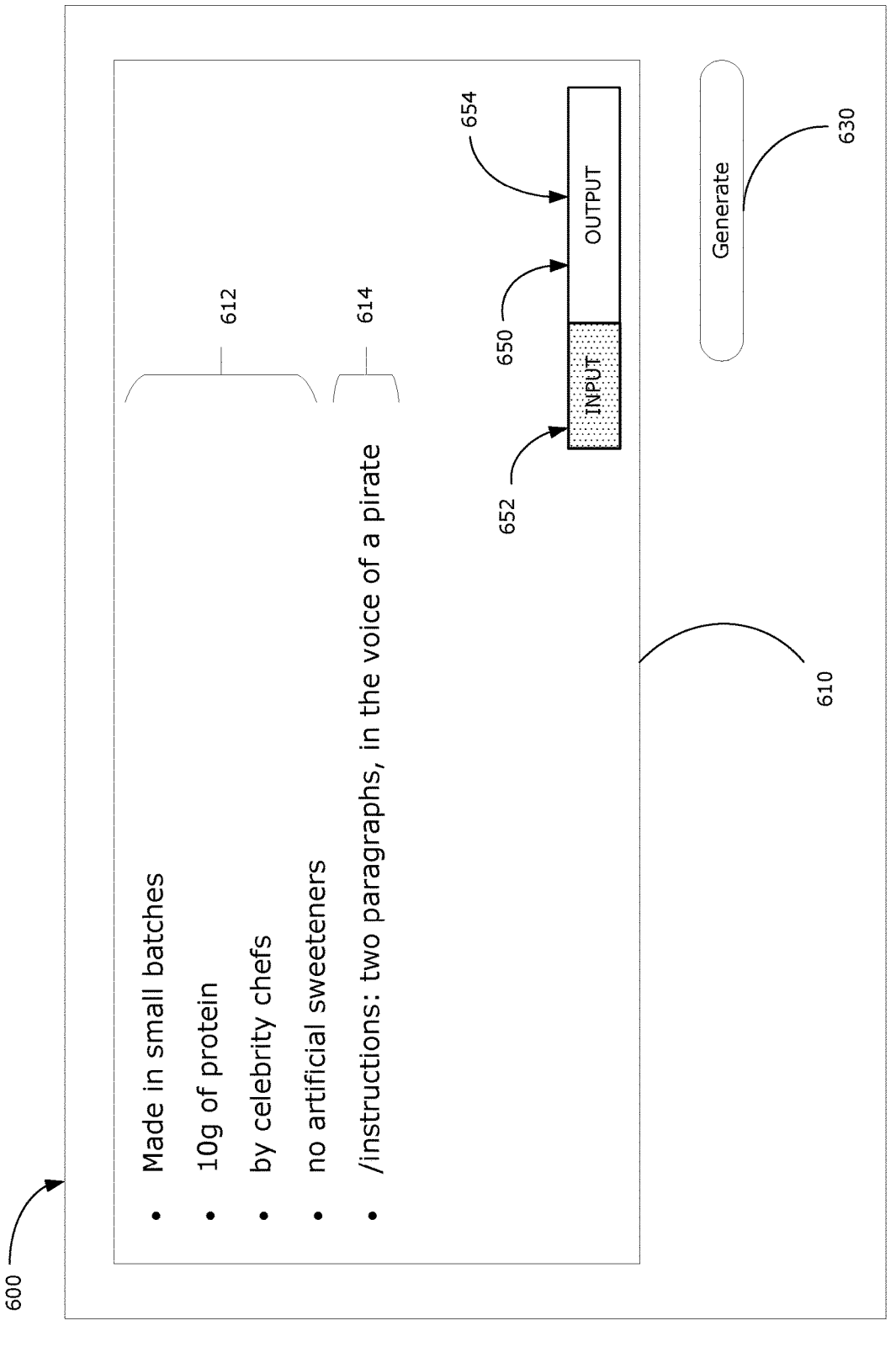

FIG. 3C illustrates an example UI 600 that may be provided by the prompt generator 500, in accordance with examples of the present disclosure. The UI 600 may include a text input field 610 for inputting user-inputted features 612 or special instructions 614 to the prompt generator 500. A representation of the total resource usage parameter may be presented as a progress bar 650, for example, with a visual representation of tokens allocated to the prompt (e.g., input 652) and available for the response (e.g., output 654).

Figure 3D:
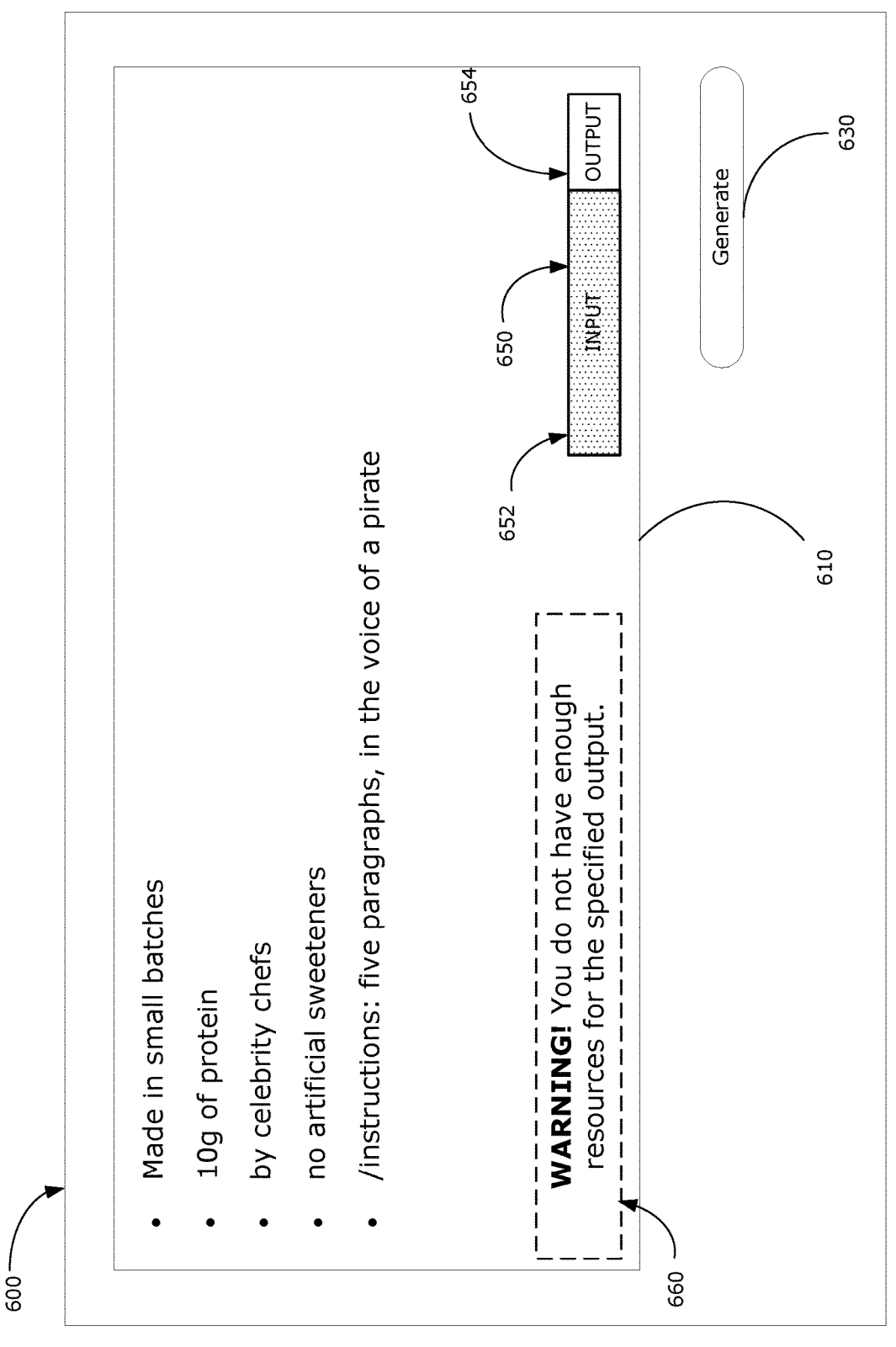

FIG. 3D illustrates an example UI 600 that may be provided by the prompt generator 500, in accordance with examples of the present disclosure. The UI 600 may include a text input field 610 for inputting user-inputted features 612 or special instructions 614 to the prompt generator 500. A representation of the total resource usage parameter may be presented as a progress bar 650, for example, with a visual representation of tokens allocated to the prompt (e.g., input 652) and available for the response (e.g., output 654). In examples, the platform may continually compare the total resource usage parameter to a resource usage threshold based on the maximum resource capacity for the LLM. In examples, if the platform determines that the total resource usage parameter exceeds the resource usage threshold, the UI 600 may also be configured to display a warning 660, for example, to notify a user that the current state of the prompt is likely to exceed the maximum resource capacity for the LLM. In other examples, in response to determining that the total resource usage parameter exceeds the resource usage threshold, the platform may generate a recommendation for reducing the total resource usage parameter, for example, to recommend to the user options for reducing either the prompt resource usage parameter or the predicted response resource usage parameter, or both. In examples, the UI 600 may also be configured to display the recommendation.

FIG. 4 is a flowchart of an example method 700 for computing a total resource parameter associated with prompting a LLM, which may be performed by a computing system, in accordance with examples of the present disclosure. For example, a processing unit of a computing system (e.g., the processor 402 of the computing system 400 of FIG. 2) may execute instructions (e.g., instructions of the prompt generator 500) to cause the computing system to carry out the example method 700. The method 700 may, for example, be implemented by an online platform or a server.

At an operation 702, a user input including instructions for generating a prompt to a large language model (LLM), may be received (e.g., by the prompt generator 500). In examples, the LLM may be a generative pre-trained transformer LLM, such as GPT-3 or ChatGPT. In examples, the user input may be received from an electronic device (e.g., via user interaction with a UI 600) as a text input including one or more user-inputted features 612 or special instructions 614 for generating the prompt.

At an operation 704, a prompt resource usage parameter may be computed based on the user input. In examples, the prompt resource usage parameter may include a number of tokens associated with the prompt $T_c$.

At an operation 706, a predicted response resource usage parameter corresponding to an anticipated response from the LLM may be generated (e.g., by a trained resource prediction model 550), based on the user input. In examples, the predicted response resource usage parameter may include a number of tokens associated with the generated response $T_r$.

Optionally, at an operation 708, a predicted complexity resource usage parameter corresponding to an anticipated response from the LLM may be generated (e.g., by a trained complexity resource prediction model 555), based on the user input. In examples, the predicted complexity resource usage parameter may include a number of additional tokens $T_c$ which may be required to generate the response. The predicted complexity resource usage parameter may be expressed in other units, not necessarily limited to a token count.

At an operation 710, a total resource usage parameter may be computed, based on the prompt resource usage parameter and the predicted response resource usage parameter. In examples, the total resource usage parameter is a representation of the total resource usage parameter with respect to a maximum resource capacity for the LLM.

Optionally, at an operation 712, the total resource usage parameter may be further computed based on the predicted complexity resource usage parameter.

At an operation 714, a representation of the total resource usage parameter may be communicated to the electronic device, to cause the electronic device to provide an output of the representation of the total resource usage parameter (e.g., via the UI 600).

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 5:
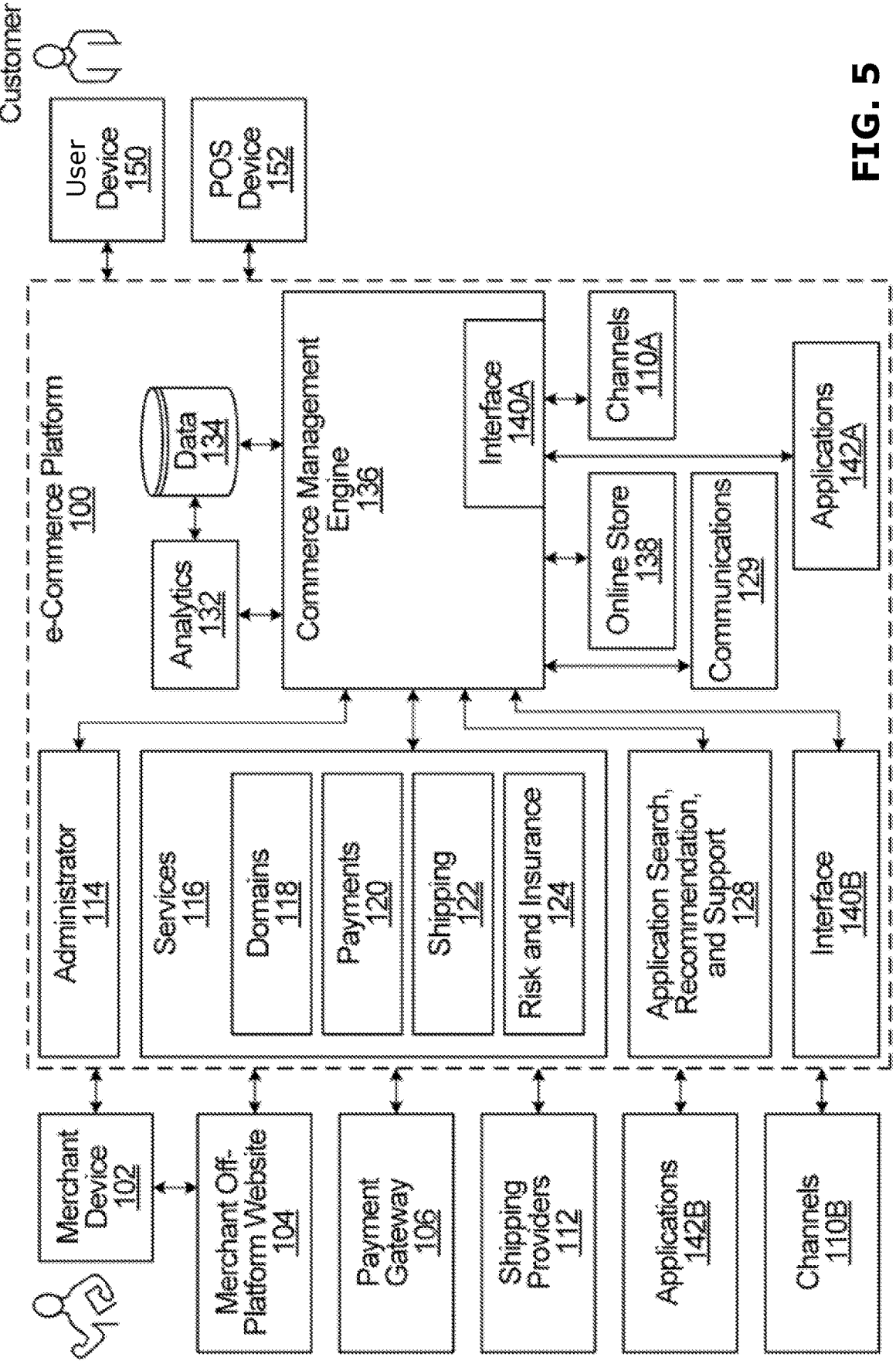
FIG. 5 is a block diagram of an example e-commerce platform, which may be an example implementation of the examples disclosed herein.

FIG. 5 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 5, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (Saas), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol).

The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 6:
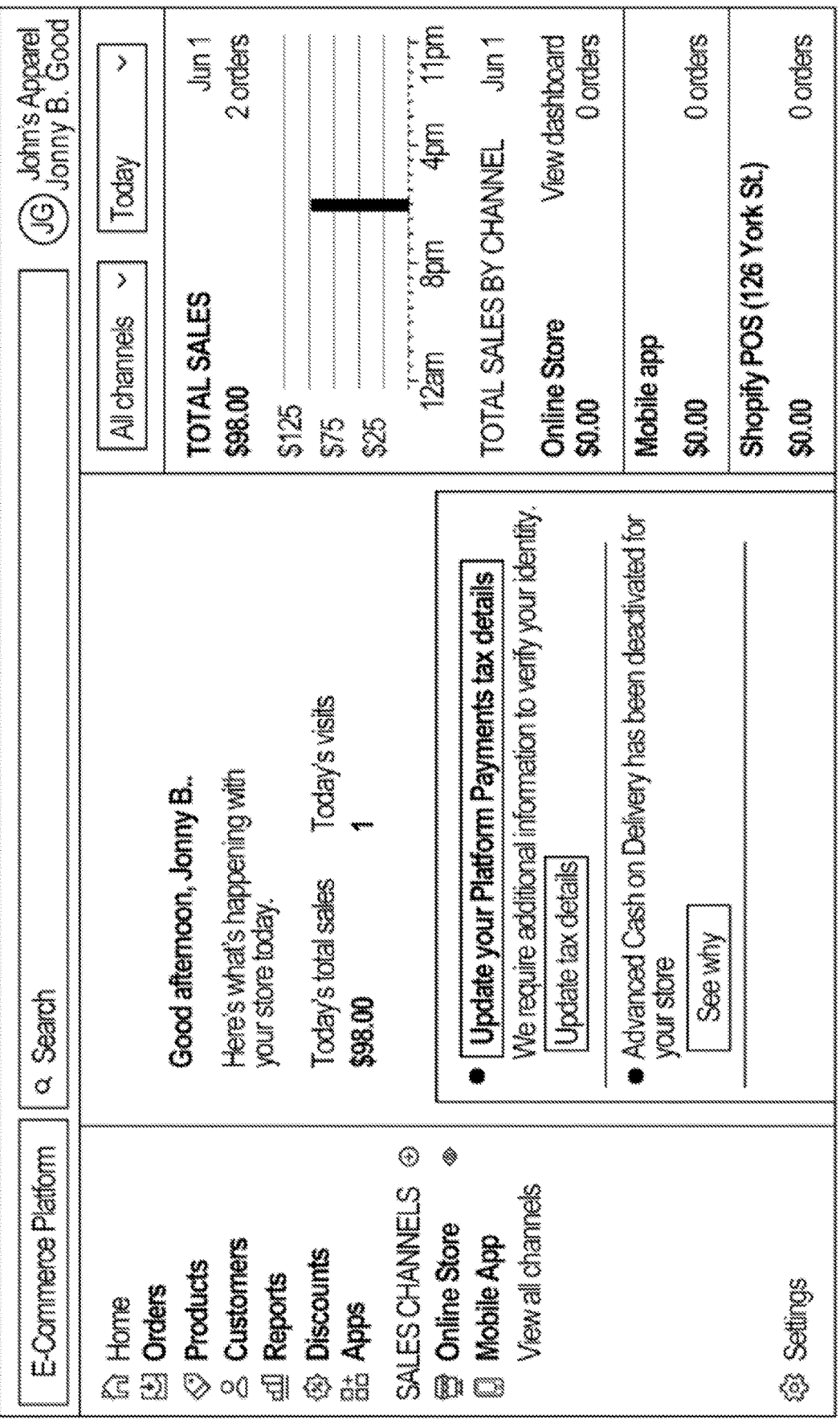
FIG. 6 is an example homepage of an administrator, which may be accessed via the e-commerce platform of FIG. 5.

FIG. 6 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalogue, managing orders, and/or the like. In some embodiments, the merchant may be able to access the different sections of the administrator 114 by using a sidebar, such as the one shown on FIG. 3. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 2, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales) (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

In some examples, the applications 142A-B may include an application that enables a user interface (UI) to be displayed on the customer device 150. In particular, the e-commerce platform 100 may provide functionality to enable content associated with an online store 138 to be displayed on the customer device 150 via a UI.

The methods and systems (e.g., prompt generator 500) as disclosed herein may be provided by the e-commerce platform as an online service to enable a user to conveniently and efficiently compute a resource usage parameter associated with prompting a LLM (e.g., for efficiently generating a textual description for a page of an online store) and indicating a likelihood that a resource usage limit for the prompt will be reached. It should be understood that the methods and systems disclosed herein may be provided as an online service by any other online platform (e.g., SaaS platform) without being limited to the e-commerce platform. The online platform may provide applications that serve as an interface layer between the user and the LLM, to enable the user to more effectively and efficiently make use of the LLM to generate text outputs.

Examples of the present disclosure may enable an indication of the computed resource usage parameter to be displayed to a user in a prompt generator user interface (UI). For example, communicating to the user a likelihood that a resource usage limit has been reached may help inform the user input to the prompt generator, to avoid a prompt causing the resource usage limit to be reached and thus avoid causing the LLM to reject the prompt or to generate poor output. Computation of the resource usage parameter may be automated to dynamically update in response to user inputs into the prompt generator, improving efficiency and use of resources.

Although the present disclosure has described a LLM in various examples, it should be understood that the LLM may be any suitable language model (e.g., including LLMs such as GPT-3 or ChatGPT, as well as other language models such as BART, among others). Additionally, it should be understood that the present disclosure is not limited to any particular language. Although English has been used in various examples, the present disclosure may be equally applicable to other human languages.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer system comprising:
a processing unit configured to execute computer-readable instructions to cause the system to:
receive, from an electronic device, a user input for generating a prompt to a large language model (LLM);
compute a prompt resource usage parameter based on the user input;
generate, by a trained resource prediction model, a predicted response resource usage parameter for a response from the LLM, based on the user input;
compute a total resource usage parameter, based on the prompt resource usage parameter and the predicted response resource usage parameter; and
communicate, to the electronic device, a representation of the total resource usage parameter, to cause the electronic device to provide an output of the representation of the total resource usage parameter.

2. The system of claim 1, wherein the electronic device is caused to display a prompt user interface (UI) enabling input of the user input and output of the representation of the total resource usage parameter.

3. The system of claim 2, wherein the prompt UI includes one or more input fields for receiving a respective one or more portions of the user input, and the prompt resource usage parameter is determined based on each of the one or more portions of the user input received in each of the one or more input fields.

4. The system of claim 1, wherein the representation of the total resource usage parameter is a representation of the total resource usage parameter with respect to a maximum resource capacity for the LLM.

5. The system of claim 4, wherein the processing unit is configured to execute computer-readable instructions to further cause the system to:
compare the total resource usage parameter to a resource usage threshold based on the maximum resource capacity for the LLM; and
in response to determining that the total resource usage parameter exceeds the resource usage threshold:

communicate a warning to the electronic device, to cause the electronic device to provide an output of the warning.

6. The system of claim 5, wherein the processing unit is configured to execute computer-readable instructions to further cause the system to:
further in response to determining that the total resource usage parameter exceeds the resource usage threshold:
generate a recommendation for reducing the total resource usage parameter; and
communicate the recommendation to the electronic device, to cause the electronic device to provide an output of the recommendation.

7. The system of claim 1, wherein the processing unit is configured to execute computer-readable instructions to further cause the system to:
generate, by a trained complexity resource prediction model, a predicted complexity resource usage parameter for the prompt, based on the user input;
wherein the total resource usage parameter is further computed based on the complexity resource usage parameter.

8. A method comprising:
receiving, from an electronic device, a user input for generating a prompt to a large language model (LLM);
computing a prompt resource usage parameter based on the user input;
generating, by a trained resource prediction model, a predicted response resource usage parameter for a response from the LLM, based on the user input;
computing a total resource usage parameter, based on the prompt resource usage parameter and the predicted response resource usage parameter; and
communicating, to the electronic device, a representation of the total resource usage parameter, to cause the electronic device to provide an output of the representation of the total resource usage parameter.

9. The method of claim 8, wherein the electronic device is caused to display a prompt user interface (UI) enabling input of the user input and output of the representation of the total resource usage parameter.

10. The method of claim 9, wherein the prompt UI includes one or more input fields for receiving a respective one or more portions of the user input, and the prompt resource usage parameter is determined based on each of the one or more portions of the user input received in each of the one or more input fields.

11. The method of claim 8, wherein the representation of the total resource usage parameter is a representation of the total resource usage parameter with respect to a maximum resource capacity for the LLM.

12. The method of claim 11, further comprising:
comparing the total resource usage parameter to a resource usage threshold based on the maximum resource capacity for the LLM; and
in response to determining that the total resource usage parameter exceeds the resource usage threshold:
communicating a warning to the electronic device, to cause the electronic device to provide an output of the warning.

13. The method of claim 12, further comprising:
further in response to determining that the total resource usage parameter exceeds the resource usage threshold:
generating a recommendation for reducing the total resource usage parameter; and communicating the recommendation to the electronic device, to cause the electronic device to provide an output of the recommendation.

14. The method of claim 8, further comprising:

generating, by a trained complexity resource prediction model, a predicted complexity resource usage parameter for the prompt, based on the user input;

wherein the total resource usage parameter is further computed based on the complexity resource usage parameter.

15. A non-transitory computer-readable medium storing instructions that, when executed by a processor of a computing system, cause the computing system to:

receive, from an electronic device, a user input for generating a prompt to a large language model (LLM);

compute a prompt resource usage parameter based on the user input;

generate, by a trained resource prediction model, a predicted response resource usage parameter for a response from the LLM, based on the user input;

compute a total resource usage parameter, based on the prompt resource usage parameter and the predicted response resource usage parameter; and communicate, to the electronic device, a representation of the total resource usage parameter, to cause the electronic device to provide an output of the representation of the total resource usage parameter.

16. The non-transitory computer readable medium of claim 15, wherein the electronic device is caused to display a prompt user interface (UI) enabling input of the user input and output of the representation of the total resource usage parameter.

17. The non-transitory computer readable medium of claim 16, wherein the prompt UI includes one or more input fields for receiving a respective one or more portions of the user input, and the prompt resource usage parameter is determined based on each of the one or more portions of the user input received in each of the one or more input fields.

18. The non-transitory computer readable medium of claim 15, wherein the representation of the total resource usage parameter is a representation of the total resource usage parameter with respect to a maximum resource capacity for the LLM.

19. The non-transitory computer readable medium of claim 18, wherein the instructions, when executed, further cause the system to:

compare the total resource usage parameter to a resource usage threshold based on the maximum resource capacity for the LLM; and in response to determining that the total resource usage parameter exceeds the resource usage threshold:

communicate a warning to the electronic device, to cause the electronic device to provide an output of the warning.

20. The non-transitory computer readable medium of claim 15, wherein the instructions, when executed, further cause the system to:

generate, by a trained complexity resource prediction model, a predicted complexity resource usage parameter for the prompt, based on the user input;

wherein the total resource usage parameter is further computed based on the complexity resource usage parameter.

\* \* \* \* \*